Aug. 18, 1931.  F. ACKERMAN  1,819,275
AUTOMOBILE LIFT
Filed Dec. 14, 1928  3 Sheets-Sheet 1
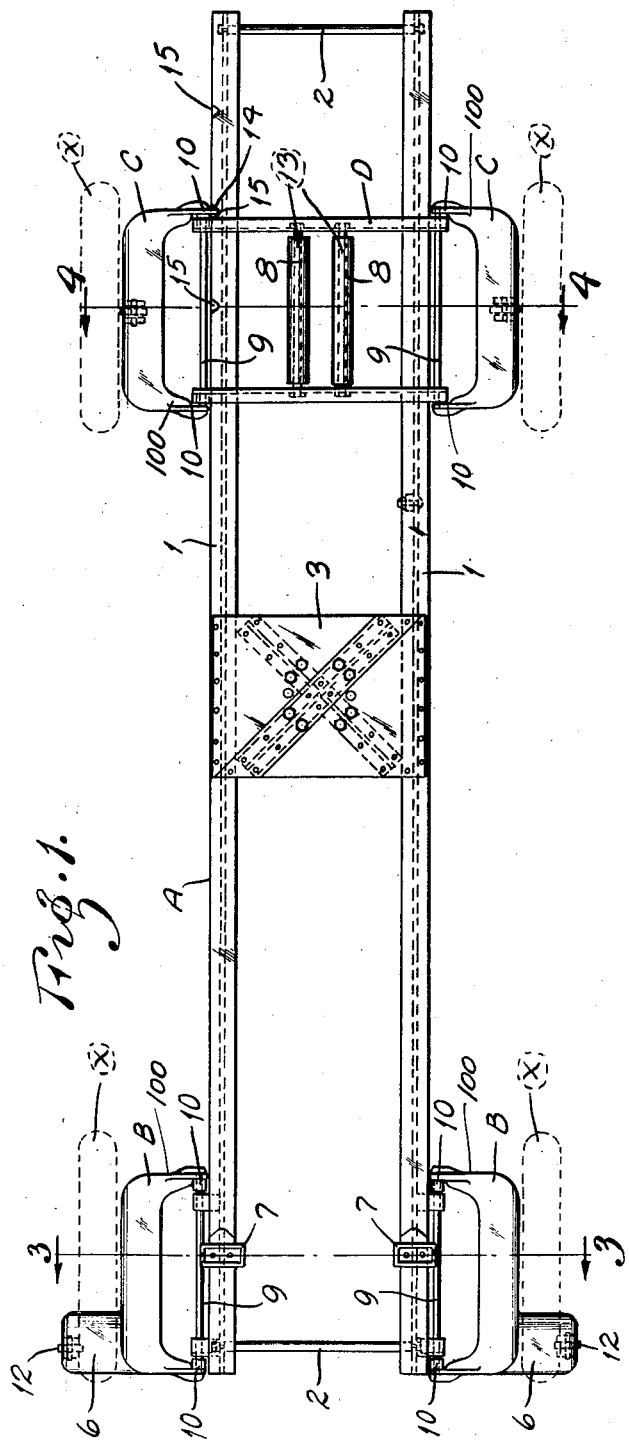
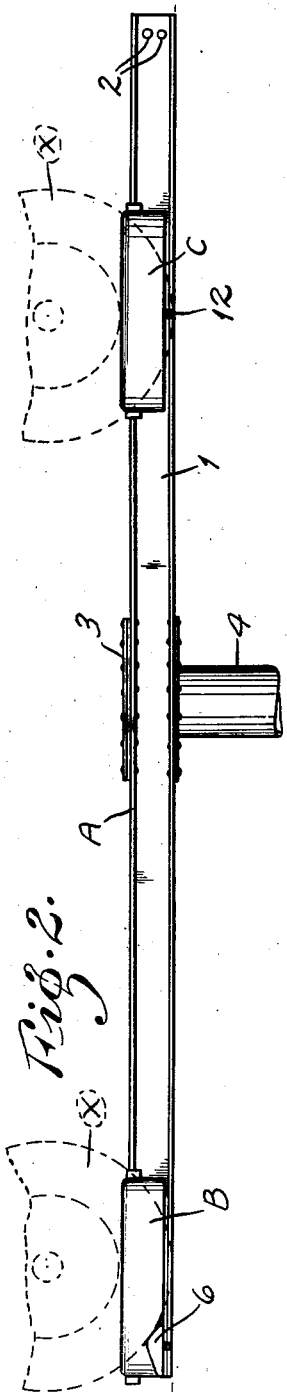
INVENTOR:
FRANK ACKERMAN.
BY Bakewell + Church
ATTORNEYS.

Aug. 18, 1931.  F. ACKERMAN  1,819,275
AUTOMOBILE LIFT
Filed Dec. 14, 1928   3 Sheets-Sheet 2
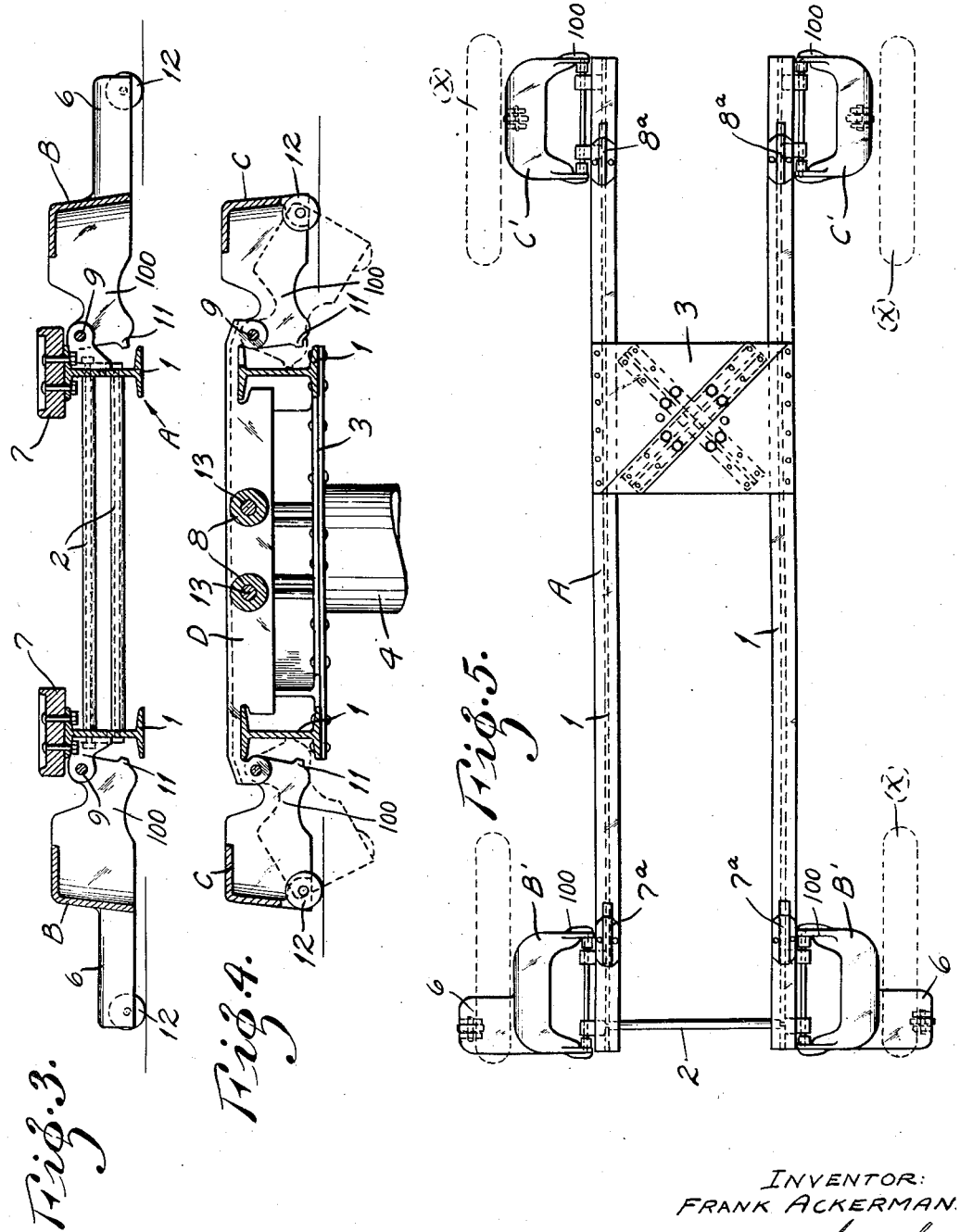
INVENTOR:
FRANK ACKERMAN.
By Bakewell & Church
ATTORNEYS.

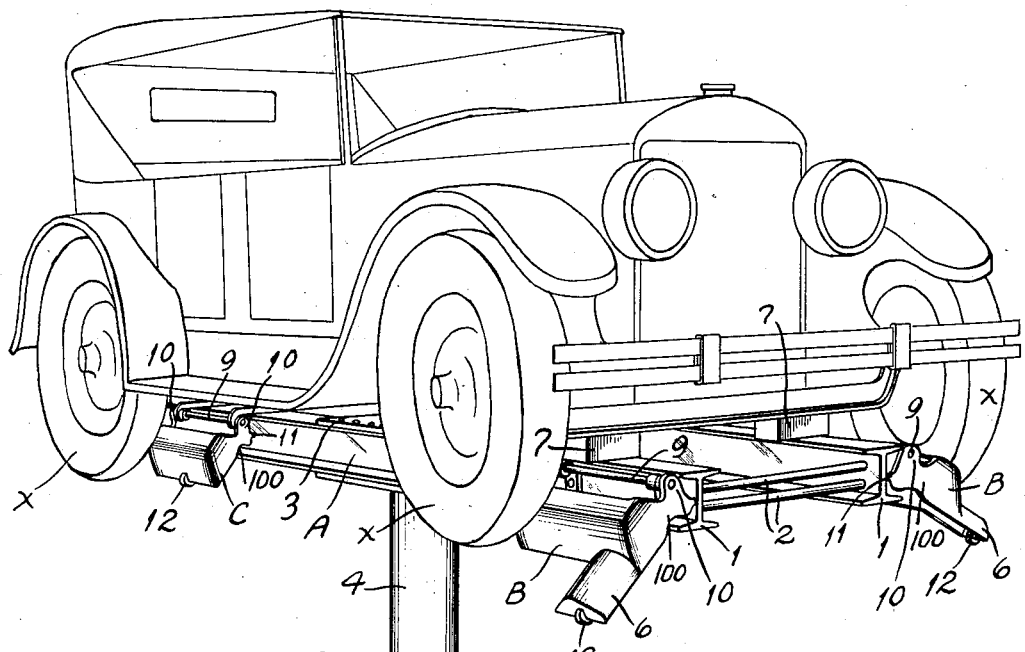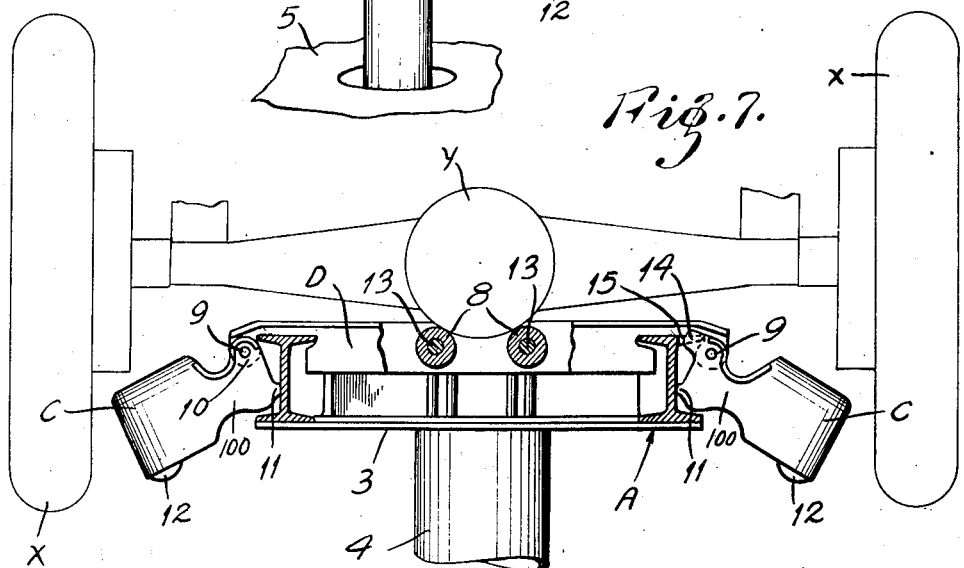

Patented Aug. 18, 1931

1,819,275

UNITED STATES PATENT OFFICE

FRANK ACKERMAN, OF ST. LOUIS, MISSOURI, ASSIGNOR TO CURTIS MANUFACTURING COMPANY, OF WELLSTON, MISSOURI, A CORPORATION OF MISSOURI

AUTOMOBILE LIFT

Application filed December 14, 1928. Serial No. 326,044.

This invention relates to devices of the kind commonly referred to as "automobile lifts", that are used in garages and automobile greasing stations for supporting an automobile in a raised position so as to facilitate the operation of inspecting or working on the under part of the chassis.

One object of my invention is to provide an automobile lift of the type in which the wheels of the automobile are free to turn or revolve when the automobile is in a raised position, which is of such design that the automobile will be automatically centered or positioned properly with relation to the platform of the lift during the operation of driving or moving the automobile over the platform, thereby overcoming the necessity of having an operator crawl under the automobile and manually adjust chassis engaging devices on the platform preparatory to raising the automobile.

Another object is to provide an automobile lift whose platform or chassis supporting structure is equipped with wheel engaging members that are adapted to co-operate with the wheels of an automobile to approximately center the automobile with relation to the platform preparatory to raising the platform and which are capable of being moved into an inactive position, out of engagement with the said wheels, when the platform is in a raised or elevated condition.

Another object is to provide an automobile lift of the rotating type, which, in addition to having the desirable features and characteristics above described, is of such design that irrespective of the angle at which the rotating platform is turned, the locating mechanism or centering mechanism of the lift is in an operative position with relation to the automobile that is to be raised by the lift.

Another object is to provide an automobile lift whose platform is provided with a means on which the rear axle housing of the automobile seats itself automatically during the first part of the upward movement of the platform, thereby insuring the longitudinal axis of the automobile being arranged in exact alignment with the longitudinal axis of the platform in the event the automobile is slightly off center when said means engages the rear axle housing of the automobile.

And still another object is to provide an automobile lift of the kind above described that can be adjusted easily to adapt it to automobiles having wheel bases of different lengths.

To this end I have devised an automobile lift which in its simplest form consists of a vertically-movable platform or chassis supporting structure constructed so that an automobile can be moved over the same when the platform is in its lowered position, and a locating mechanism on the platform constructed so that it will co-act with the wheels or the wheel tires of the automobile to cause the automobile to be approximately centered with relation to the platform during the operation of moving the automobile over the platform, and when the platform is in its raised position, said locating mechanism will not prevent the wheels of the automobile from turning or rotating freely. The platform of the lift can be of any preferred construction and any suitable means can be used to raise and lower said platform. In the form of my invention herein illustrated, the platform or chassis supporting structure consists of a relatively long and narrow frame of less width than the tread of the conventional automobile, said frame being connected to the upper end of a vertically-disposed piston that reciprocates in a cylinder set in the foundation on which the platform rests when it is in its lowered position. I wish it to be understood, however, that the particular design of the chassis engaging portion, the particular design of the locating mechanism, and the particular design of the means used to raise and lower said chassis engaging portion are immaterial, so far as my broad idea is concerned.

In the preferred form of my invention herein illustrated the locating mechanism is composed of four shiftable members, herein referred to as wheel engaging members, mounted on the platform in such a manner that when the platform is in its lowered position they will co-operate with the wheels of the automobile, preferably the tires on the wheels, to centralize the automobile with relation to the platform. The locating mechanism herein illustrated is also designed so that it will cause the front axle and the rear axle housing of the automobile to align with chassis engaging devices on the platform during the operation of driving or moving the automobile over the platform. Thereafter, when the platform moves upwardly, said wheel engaging members move automatically into an inactive or inoperative position wherein they do not interfere with the rotary movement of the wheels. It is not essential, however, that four wheel engaging members be used or that the wheel engaging members be mounted on the platform in such a way that they will move automatically into an inactive position when the platform moves upwardly, as my broad idea contemplates equipping the platform with a pair of shiftable wheel engaging devices or wheel tire engaging members, constructed or arranged so that they are capable of assuming an inoperative or inactive position after they have performed the function for which they are designed. I prefer, however, to pivotally mount the wheel engaging members on the platform in such a way that gravity will cause said members to automatically shift inwardly into an inactive position when the platform starts to move upwardly, and thereafter, when the platform is restored to its lowered position, said wheel engaging members, by contacting with the base under the platform, will automatically move outwardly into an operative position, ready to co-operate properly with the next automobile that is to be raised by the lift. The shape or form of the wheel engaging members can be varied, but it is preferable to construct said members so that they will co-act with the inner side faces of the tires of the automobile to centralize the automobile with relation to the platform. When the platform is provided with four wheel engaging members, as herein illustrated, one pair of said members, usually the members that co-operate with the front wheels, are equipped with laterally-projecting chocks or abutments that co-operate with the wheels to arrest the forward movement of the automobile when it is being moved over the platform, thereby causing the front axle and the rear axle housing of the automobile to align with the chassis engaging devices on the platform.

In order to insure the load being properly balanced on the platform, the chassis engaging device on the platform which co-acts with the rear axle housing of the automobile is so constructed that said rear axle housing will automatically seat itself thereon, during the first part of the upward movement of the platform. In the preferred form of my invention herein illustrated this desirable result is attained by equipping the platform with a pair of spaced, horizontally-disposed, parallel rollers that extend longitudinally of the platform adjacent the longitudinal center of the platform so that when the platform starts to move upwardly the usual convexed portion of the differential case of the rear axle housing will be engaged by said rollers, with the result that the automobile will be shifted into exact longitudinal alignment with the longitudinal axis of the platform in the event the automobile is slightly off center, when said rollers engage said rear axle housing. A chassis engaging device of the kind just described is particularly adapted for use on a lift which is intended to be used for raising automobiles of various makes, due to the fact that practically all of the various makes of automobiles now on the market comprise a rear axle housing provided with a differential case whose underside is curved or convexed sufficiently to permit it to seat itself automatically on a pair of parallel, longitudinally-disposed rollers arranged in spaced relation adjacent the longitudinal center of the platform, but if the lift is intended to be used only with automobiles of a particular make or kind, the platform may be provided with a device or devices that engage another portion or different portion of the rear axle housing.

In instances where front and rear wheel engaging members are provided for the front and rear wheels of the automobile, one pair of wheel engaging members may be so arranged that they can be moved longitudinally towards and away from the other pair of wheel engaging members to adapt the lift for use with automobiles having wheel bases of different lengths. In the form of my invention herein illustrated the wheel engaging members that are adapted to co-act with the rear wheels of the automobile are carried by a sled or support that is mounted on the platform in such a way that it can be adjusted longitudinally of same into various positions, so as to increase or decrease the distance between the front and rear wheel engaging members. The spaced longitudinally-disposed rollers previously referred to that constitute the chassis engaging device which co-operates with the rear axle housing are preferably mounted on said sled or shiftable support, thereby causing the distance between the front and rear chassis engaging devices to be varied simultaneously with the operation of changing the distance between the front and rear wheel engaging members.

Figure 1 of the drawings is a top plan view of an automobile lift constructed in accordance with my invention.

Figure 2 is a side elevational view of said lift.

Figure 3 is a transverse sectional view, taken on the line 3—3 of Figure 1, looking in the direction indicated by the arrows.

Figure 4 is a transverse sectional view, taken on the line 4—4 of Figure 1, looking in the direction indicated by the arrows.

Figure 5 is a top plan view of an automobile lift embodying my invention, which differs from the lift shown in Figure 1, in that no provision is made for varying the distance between the front and rear wheel engaging members and the front and rear chassis engaging devices.

Figure 6 is a perspective view of a lift of the kind shown in Figure 1, illustrating how the wheel engaging members on the platform move into an inactive position when the platform moves upwardly; and Figure 7 is a rear end elevational view of said lift with the platform and part of the sled shown in transverse section, illustrating how the rear axle housing of the automobile centers itself automatically on the rollers on said sled during the first part of the upward movement of the platform.

Referring to Figures 1 to 4 of the drawings which illustrate one form of my invention, A designates the platform of my improved lift which is herein illustrated as being composed of two parallel I-beams 1 that are maintained in spaced relation by cross members 2 arranged at the ends of said I-beams, and a structure 3 arranged intermediate the ends of said beams that is used to connect said beams to a vertically-disposed piston or other suitable device 4 that is used to raise and lower the platform. As shown in Figure 6, the piston 4 reciprocates vertically in a cylinder that is set in a foundation 5 located directly beneath the platform A, when said platform is in its lowered position.

The platform A is provided with a pair of front wheel engaging members B and a pair of rear wheel engaging members C, the front wheel engaging members B being equipped with laterally-projecting chocks or abutments 6. Said wheel engaging members B and C are mounted on the platform A in such a way that when the platform is in its lowered position, said wheel engaging members will project laterally from the platform a sufficient distance to co-operate with the tires $x$ of an automobile that is moved over the platform to centralize and locate the automobile properly with relation to the platform.

Adjacent the front end of the platform is a pair of chassis engaging devices 7 that are adapted to engage the front axle of the automobile when the platform moves upwardly, and adjacent the rear end of the platform is a pair of parallel, longitudinally-disposed rollers 8 that engage the differential case $y$ on the rear axle housing of the automobile when the platform moves upwardly, thereby causing the automobile to rest upon the chassis engaging devices 7 and 8 on the platform. The chocks or laterally-projecting abutments 6 on the front wheel engaging members B co-operate with the tires on the front wheels of the automobile to locate the front axle and rear axle housing of the automobile in alignment with the chassis engaging devices 7 and 8, and the members B and C co-operate with the tires on the four wheels to centralize the automobile, in the operation of driving or moving the automobile over the platform when the platform is in its lowered position.

In order that the wheel engaging members B and C will not interfere with the rotary movement of the wheels of the automobile when the platform is in its raised position, said members are mounted on the platform in such a way that they can shift or be shifted into an inactive or inoperative position when the platform is raised. Preferably, the wheel engaging members B and C are carried by swinging arms 100 that are pivotally mounted on the platform in such a manner that gravity causes said members to swing downwardly out of engagement with the tires on the wheels when the platform A moves upwardly away from the base 5, and thereafter, when the platform is restored to its lowered position, said wheel engaging members will be automatically restored to their operative position, i. e., a position in which they will co-act with the wheels of the automobile that is to be raised to centralize the automobile on the platform. If the members B are provided with chocks or similar devices, said members B will co-act with the front wheels of the automobile to cause the front axle and rear axle housing of the automobile to be arranged in alignment with the parts on the platform on which the automobile rests when the platform is raised. Obviously, various other means than swinging arms might be employed to carry the wheel engaging members and move said members into and out of their active or operative position. The essential thing, so far as my broad idea is concerned, is that the platform or chassis supporting portion of the lift be equipped with wheel engaging means located at opposite sides of the platform for co-operating with the wheels of an automobile that is to be raised to center the automobile with relation to the platform, when the automobile is moved over the platform, and mounted so as to be capable of assuming such a position when the platform is in a raised condition, that said wheel engaging means will be spaced away from the wheels, and thus provide access to the wheels and permit them to rotate freely. In the lift herein illustrated the arms 100 on the wheel engaging members B and C are pivotally mounted on horizontally-disposed rods or pivots 9 that pass through lugs 10 on said arms 100 and cooperating lugs carried by the platform. In order to prevent the wheel engaging members B and C from swinging downwardly into a vertical position, and thus perhaps interfering with the downward movement of the platform during the operation of lowering the same, the arms 100 of said members are mounted on the platform in such a way that they will swing downwardly out of engagement with the tires when the platform starts to move upwardly, and thereafter, will remain in a slightly angular or downwardly-inclined position, as shown in Figure 7, the arm of each of said members being provided with a stop 11, as shown in Figure 7, that co-acts with the adjacent I-beam of the platform to limit the downward swinging movement of said member. If desired, the wheel engaging members B and C can be provided on their undersides with rollers 12 that contact with and roll upon the base 5, as the platform approaches said base, during the operation of lowering the platform, thereby eliminating the possibility of the wheel engaging members catching on the base, and thus failing to swing from an angular position into a horizontal position when the platform is approaching its lowered position.

The rear wheel engaging members C and the chassis engaging devices 8 that co-act with the rear axle housing of the automobile, are preferably carried by a sled or support D that can be shifted longitudinally of the platform A, so as to vary the distance between the front and rear wheel engaging members and the front and rear chassis engaging devices 7 and 8 on the platform. The sled D may consist of any suitable kind of shiftable supporting structure on the platform, the sled D herein illustrated being composed of two transversely-disposed members connected together intermediate their ends by rods 13 that act as shafts for the rollers 8 and having their end portions connected together by the rods 9 which serve as pivot pins or fulcrums for the rear wheel engaging members C. Any suitable means can be used for holding the sled D in adjusted position, the means herein illustrated for this purpose consisting of a lug 14 on one of the rear wheel engaging members C (see Figure 7) that is adapted to co-operate with a set of notches 15 in one of the I-beams of the platform A. By swinging this wheel engaging member C upwardly a certain distance, the lug 14 thereon will be withdrawn from the notch 15 in which it is positioned, after which the sled can be moved longitudinally of the platform so as to bring said lug into registration or alignment with one of the other notches 15 in the platform, thereby changing the distance between the front and rear chassis engaging devices and the front and rear wheel engaging members. The rollers 8 on the sled D are made long enough so that they will co-operate properly with the rear axle housings of automobiles whose wheel bases vary in length only a few inches, thereby enabling the lift to be used with various makes of automobiles having approximately the same wheel base without changing the adjustment of the sled D, but permitting the lift to be used with practically all makes of automobiles by shifting the sled D forwardly when an automobile of short wheel base is to be raised and shifting said sled rearwardly when an automobile of long wheel base is to be raised.

In using my improved lift, the automobile that is to be raised is driven or moved over the platform A when said platform is in its lowered position, the wheel engaging members B and C on the platform co-acting with the tires of the automobile to locate the automobile properly with relation to the chassis engaging devices 7 and 8 on the platform. When the platform moves upwardly the devices 7 at the front end of the platform contact with the front axle of the automobile and the rollers 8 on the sled D contact with the differential case y of the rear axle housing, said differential case seating itself automatically between the rollers 8 in the event the longitudinal axis of the automobile is not in exact alignment with the longitudinal axis of the platform, thereby insuring the load being balanced properly on the platform. As the platform moves upwardly, the wheel engaging members B and C shift automatically into an inactive or inoperative position, as shown in Figures 6 and 7, wherein they do not interfere with the free rotary movement of the wheels. When the platform is restored to its lower position the wheel engaging members B and C automatically assume an active or operative position wherein they project laterally from the platform, and thus are in readiness to co-act with the wheels of the next automobile that is to be raised to locate the automobile properly with relation to the chassis engaging devices on the platform. If the next automobile that is to be raised has a wheel base considerably longer or shorter than the wheel base of the automobile that was previously raised, the sled D can be adjusted longitudinally of the platform so as to arrange the front and rear wheel engaging members and the front and rear chassis engaging devices in proper position to co-operate with the wheels and axles of the automobile.

As previously stated, it is not essential that the lift be constructed in such a way as to permit the distance between the front and rear wheel engaging members and the front and rear chassis engaging devices to be varied, in the event the lift is intended to be used in connection with only one make or kind of automobile. Therefore, in Figure 5 of the drawings I have illustrated my invention embodied in an automobile lift whose front and rear wheel engaging members B' and C' are pivotally mounted on the platform A in such a manner that they cannot be shifted longitudinally towards or away from each other, the chassis engaging devices on the platform consisting of front devices 7$^a$ permanently mounted on the platform that are adapted to engage the front axle of the automobile and rear chassis engaging devices 8$^a$ permanently mounted on the platform and arranged so that they will engage the rear axle housing or other chassis parts of the automobile at opposite sides of the differential case.

My automobile lift is a decided improvement on prior automobile lifts of the type in which the wheels of the automobile are free to turn when the platform of the lift is raised, due to the fact that it comprises a locating mechanism which automatically centers the automobile in substantially correct relation to the platform of the lift, during the operation of moving or driving the automobile over the platform when the platform is in its lowered position. When the centering mechanism is of the particular construction herein illustrated it also automatically locates the front axle and rear axle housing of the automobile in alignment with the parts on the platform on which said axle and axle housing are adapted to rest. My lift is also a decided improvement on rotating lifts of the type in which the platform is provided with runways or channels for the wheels of the automobile to travel in, because my lift is so constructed that the wheels of the automobile are free to turn when the platform is raised, a thing that is not possible with prior rotating lifts of the type mentioned. In view of the fact that the locating mechanism of my improved lift is carried by the platform, it is not necessary to have the platform come to rest at any particular position on the base 5 of the structure. On the contrary, my lift is so constructed that irrespective of the position in which the platform comes to rest on the base 5, the locating mechanism will function properly with the next automobile that is driven or moved over the platform.

Having thus described my invention, what I claim as new and desire to secure by Letters Patent is:

1. An automobile lift provided with a vertically movable platform, wheel engaging members adapted to co-operate with one pair of wheels of the automobile that is to be raised to arrest the automobile in a certain position with relation to the platform during the operation of moving the automobile over the platform and a shiftable means on the platform for supporting said members and maintaining said members in an inactive position with relation to said wheels, while the platform is in a raised condition.

2. An automobile lift, comprising a vertically movable platform, wheel engaging members adapted to co-operate with the four wheels of an automobile that is to be raised to centralize the automobile longitudinally with relation to the platform, devices on one pair of wheel engaging members adapted to arrest the automobile in a certain position with relation to the platform during the operation of moving the automobile over the platform and a shiftable means on the platform for supporting said members, said members being adapted to be shifted into an inactive position relatively to the wheels, when the platform is raised.

3. An automobile lift provided with a vertically movable platform equipped with wheel engaging members arranged so as to centralize the automobile longitudinally with relation to the platform in the operation of moving the automobile over the platform, and means whereby gravity will cause said members to automatically assume an inactive or inoperative position when the platform moves upwardly.

4. An automobile lift, comprising a vertically-movable platform, and wheel engaging members hinged to said platform in such a way that they will automatically assume an inactive position when the platform is raised and will be automatically restored to an operative position when the platform is restored to its lowered position.

5. An automobile lift, comprising a vertically movable platform, front and rear wheel engaging members, means for shiftably mounting said members on the platform, said members being adapted to assume an inactive position with relation to the wheels of the automobile when said platform is raised, and means for enabling one pair of said wheel engaging members to be adjusted to accommodate automobiles of different wheel bases.

6. An automobile lift, comprising a vertically movable platform, and pivotally mounted wheel engaging members on said platform arranged so that they will co-act with the side faces of the tires of an automobile that is moved over the platform to centralize the automobile with relation to the platform, preparatory to raising the automobile.

7. An automobile lift, comprising a vertically movable platform, and laterally projecting wheel engaging members on said platform pivotally mounted in such a way that they have a restricted swinging movement relatively to the platform when the platform is raised.

8. An automobile lift, comprising a chassis supporting structure that is adapted to be raised and lowered, and wheel engaging members carried by said supporting structure and adapted to co-operate with the wheels of the automobile to be raised to approximately center the automobile with relation to said supporting structure, said wheel engaging members being mounted so as to be capable of assuming an inactive position relatively to said wheels, when said supporting structure is in a raised condition.

9. An automobile lift, comprising a chassis supporting structure that is adapted to be raised and lowered, and wheel engaging members carried by said supporting structure and adapted to co-operate with the wheels of the automobile to be raised to approximately center the automobile with relation to said supporting structure, said wheel engaging members being mounted so as to shift automatically into an inactive position relatively to said wheels, when said supporting structure moves upwardly.

10. In an automobile lift, the combination of a vertically-movable platform or chassis supporting structure, and wheel engaging means located at opposite sides of said platform for co-operating with the wheels of an automobile that is to be raised to approximately center the automobile with relation to the platform when the automobile is moved over the platform, said wheel engaging means being carried by the platform and mounted so as to be capable of assuming such a position when the platform is in a raised condition that said wheel engaging means will be spaced away from the wheels so as to provide access to same and permit the wheels to rotate freely.

11. An automobile lift, comprising a vertically-movable platform constructed and arranged so that an automobile can be moved over the same when said platform is in its lowered position, wheel engaging members arranged at opposite sides of the longitudinal axis of the platform, and shiftable elements on the platform for moving said members outwardly into an active position wherein they engage the wheels of the automobile, and inwardly into an inactive position wherein said members are spaced away from said wheels.

12. An automobile lift, comprising a vertically-movable platform constructed and arranged so that an automobile can be moved over the same when said platform is in its lowered position, wheel engaging members arranged at opposite sides of the longitudinal axis of the platform, and swinging elements on said platform for shifting said members into and out of their active position.

13. An automobile lift, comprising a platform that is adapted to be raised and lowered, devices on the platform that are adapted to engage the front axle and the rear axle housing of the automobile that is being raised, and a locating mechanism carried by the platform and provided with wheel engaging members that are adapted to co-operate with the wheels of the automobile to approximately center the automobile longitudinally with relation to the platform and also cause the axles of same to align with said chassis engaging devices when the automobile is driven over the platform, said wheel engaging members being capable of being shifted into an inactive position wherein they are spaced away from the wheels, when the platform is in a raised condition.

14. An automobile lift, comprising a vertically-movable platform, wheel engaging members that are adapted to co-operate with the wheels of an automobile that is to be raised to approximately center the automobile longitudinally with relation to the platform prior to the upward movement of the platform, a means on the platform that is adapted to engage the rear axle housing of the automobile during the upward movement of the platform and shift the automobile laterally into exact longitudinal alignment with the platform if the automobile is slightly off center, and a shiftable means for moving said wheel engaging members into an inactive position wherein they are spaced away from the wheels of the automobile, when the platform is in a raised condition.

15. An automobile lift provided with a vertically-movable platform, and a chassis engaging device on said platform provided with a pair of longitudinally disposed, parallel rollers arranged in spaced relation so as to engage the differential case of the rear axle housing of the automobile when the platform moves upwardly and thus automatically shift the automobile into exact longitudinal alignment with the platform in the event the automobile is slightly off center when said rollers engage said differential case, said rollers being of considerable length so as to provide for variation in the length or wheel base of the automobiles with which the lift is used.

16. An automobile lift, comprising a platform or chassis supporting structure that is adapted to be raised and lowered, wheel engaging means arranged on said platform at opposite sides of the longitudinal axis of same and adapted to co-act with the wheels of an automobile that is to be raised to approximately center the automobile longitudinally with relation to the platform, and laterally-projecting chocks or wheel stops carried by said wheel engaging means, for the purpose described, said means being adapted to be shifted out of engagement with the wheels when the platform is in a raised condition.

17. An automobile lift, comprising a rotatable platform that is adapted to be raised and lowered, wheel engaging members on said platform that are adapted to co-operate with the wheels of the automobile that is to be raised to assist in centering the automobile longitudinally with respect to the platform, and means for causing said members to automatically assume an inactive position when the platform moves upwardly, said wheel engaging members being adapted to automatically assume an active position, by contacting with the ground or base under the platform, when the platform is restored to its lowered position.

FRANK ACKERMAN.